United States Patent [19]
Levasseur

[11] Patent Number: 5,892,298
[45] Date of Patent: Apr. 6, 1999

[54] CONTROL CIRCUIT FOR SELECTIVELY PROVIDING ELECTRICAL ENERGY TO AN ELECTRICALLY CONTROLLED LOCK ACTUATOR

[75] Inventor: Joseph Leo Levasseur, St. Louis, Mo.

[73] Assignee: Coin Acceptors, Inc., St. Louis, Mo.

[21] Appl. No.: 31,561

[22] Filed: Feb. 26, 1998

[51] Int. Cl.$^6$ ........................................................ H02J 9/06
[52] U.S. Cl. ............................. 307/64; 307/66; 361/139; 361/615; 200/50.01
[58] Field of Search .............................. 307/64, 66, 10.2, 307/85; 361/139, 170, 615; 200/50.01

[56] References Cited

U.S. PATENT DOCUMENTS

| | | | |
|---|---|---|---|
| 4,272,650 | 6/1981 | Bolgiano | 307/66 |
| 4,307,789 | 12/1981 | Bertot | 307/10.2 |
| 4,837,560 | 6/1989 | Newberry | 307/66 |
| 5,148,042 | 9/1992 | Nakazoe | 307/66 |
| 5,204,663 | 4/1993 | Lee . | |
| 5,581,133 | 12/1996 | Smith et al. | 361/615 |

OTHER PUBLICATIONS

Claghorn et al. U.S. Patent Application, Serial No. 08/050865, Filed Jun. 26, 1997, Entitled Electrically Controllable Locking Device for Vending Machines and the Like.

*Primary Examiner*—Albert W. Paladini
*Attorney, Agent, or Firm*—Haverstock, Garrett & Roberts

[57] ABSTRACT

A circuit which includes a primary power source, a reserve power source, switch means, a first diode, a second diode, and processing means selectively provide power to each of the lock actuator and the processing means from either the primary power source or the reserve power source. The reserve power source is connected between ground and the lock actuator and the switch means is connected between the reserve power source and the lock actuator. The first diode is connected between the reserve power source and the switch means and the second diode is operatively connected between the primary power source and the switch means such that a cathode of the second diode is connected between the first diode and the switch means. The processing means includes a first input operatively connected between the switch means and the lock actuator. A voltage level of the primary power source may be selected sufficiently greater than a voltage level of the reserve power source such that the first diode remains OFF if the switch means is closed and both voltage levels are present at the respective power sources.

27 Claims, 1 Drawing Sheet

CONTROL CIRCUIT FOR SELECTIVELY PROVIDING ELECTRICAL ENERGY TO AN ELECTRICALLY CONTROLLED LOCK ACTUATOR

FIELD OF THE INVENTION

This invention relates generally to electrically controlled locking devices which can be used in vending machines and, more particularly, to a control circuit for selectively providing electrical energy from either an external, primary source of electrical energy or a reserve source of electrical energy to an electrically controlled lock actuator of a vending machine.

BACKGROUND OF THE INVENTION

Lock handle assemblies such as that disclosed in U.S. Pat. No. 4,760,721 are commonly utilized in vending machines for securing the vending machine cabinet door to the vending machine cabinet. Such lock handle assemblies have proven relatively affective at securing vending machines. However, although difficult, it is possible for such lock handle assemblies to be picked. Further, it is also possible for persons to obtain a copy of the key without authorization. A person with an unauthorized copy of a key may then be able to gain access to a large number of vending machines without the knowledge of the proprietor of the vending machines. Attempts to increase vending machine security in order to address such problems have been made in the past. For example, U.S. Pat. No. 4,167,104 describes a solenoid enabled lock which is configured for use in association with lock handle assemblies. Other types of locking mechanisms including a variety of types of electrically controlled lock actuators are also possible. For example, lock assemblies which are actuated by motors also exist. In vending machines and other locations where electrically controlled locks are used a source of external electrical energy is often available for delivering current to the lock actuator of such assemblies. However, when such source of external electrical energy is unavailable for some reason, such as a power outage for example, it is still desirable to be able to operate such lock assemblies so that access to the vending interior is still possible.

Accordingly, it is an object of the present invention is to provide a circuit for selectively delivering electrical energy to an electrically controllable lock actuator.

Another object of the present invention is to provide a circuit for selectively providing power to processing means which is used to control delivery of electrical energy to a lock actuator.

A further object of the present invention is to provide a circuit which facilitates an extended the useful life of a reserve source of electrical energy, which reserve source may be used to deliver electrical energy to a lock actuator and/or processing means.

SUMMARY OF THE INVENTION

These and other objects of the invention are attained by an apparatus which, in one embodiment, is a circuit which includes a primary power source, a reserve power source, switch means, a first diode, a second diode, and processing means. The reserve power source is connected between ground and the lock actuator and the switch means is connected between the reserve power source and the lock actuator. The first diode is connected between the reserve power source and the switch means and the second diode is connected between the primary power source and the switch means such that a cathode of the second diode is connected between the first diode and the switch means. The processing means includes a first input operatively connected between the switch means and the lock actuator.

The first input of the processing means may be an enabling or triggering input to which a voltage is only applied when the switch means is closed, the processing means being responsive to the applied voltage to effect delivery of current to the lock actuator upon receipt of predetermined lock control information at a second input. A normal voltage level of the primary power source is preferably sufficiently greater than a normal voltage level of the reserve power source such that when both normal voltage levels are present the first diode remains in an OFF state when the switch means is closed and the voltage applied at the first input of the processing means is provided from the primary power source. In the event that the primary power source fails, such as is the case when a vending machine is unplugged or there is a power outage at the vending machine location, the normal voltage level of the primary power source is not present such that an actual voltage level of the primary power source falls substantially to zero. In such case the first diode is placed in an ON state when the switch means is closed and the voltage applied at the first input of the processing means is provided from the reserve power source. Similarly, when the normal voltage level of the primary power source is present the electrical energy delivered to the lock actuator preferably comes from the primary power source and when the actual voltage level of the primary power source falls to substantially zero the electrical energy delivered to the lock actuator will preferably come from the reserve power source. In this manner the reserve power source, which may be a battery, is only utilized when necessary, thus extending its useful life before replacement is necessary.

The processing means second input may be connected to receive lock control information from a variety of sources. For example, such second input may be connected through associated input circuitry to receive information from any type of card interface device including contact-type interface devices and inductive-type interface devices. Further, such second input may be connected to some type of human interface device such as a plurality of input keys or a touch sensitive screen interface either of which may be located on a vending machine where such input keys or such screen may be used to input a lock control code. It is recognized that depending on the nature of the system or device from which the lock control information comes from, the processing means may be for example, a microprocessor, a microcontroller, or an application specific integrated circuit (ASIC).

With respect to the switch means, such switch means is preferably a normally-open type switch means and it is recognized that a number of variations of such switch means could be utilized. For example, such switch means may be a mechanically actuated switch means which is actuated or closed when a card is inserted into a card opening of a card reader device. Similarly, a mechanically actuated switch means may be actuated or closed by depressing an input key located on the vending machine. Further, such switch means may be a magnetically actuated switch means such as a reed-type switch, or such switch means may be optically/electrically actuated such as by an optical scanning mechanism or an optical interrupt.

The circuit according to the present invention may be utilized for delivering electrical energy to different types of electrically controllable lock actuators including, for example, solenoid-type lock actuators as well as motor-type lock actuators.

DETAILED DESCRIPTION OF THE DRAWINGS

Figure 1:
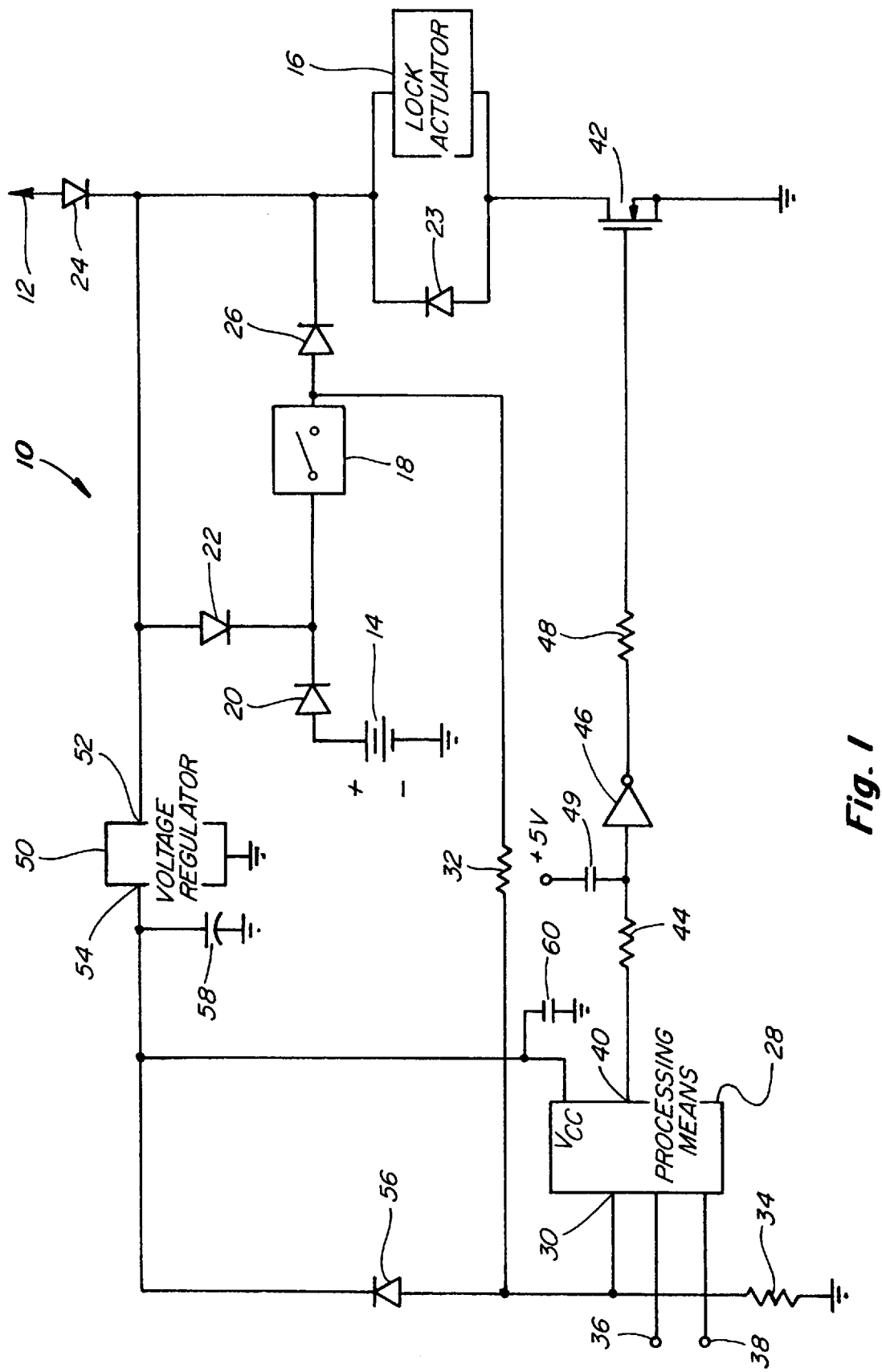
FIG. 1 is a schematic illustration of a circuit in accordance with the present invention.

Referring now to the drawings, number 10 in FIG. 1 depicts one embodiment of a circuit in accordance with the present invention. Both a primary power source 12 and a reserve power source 14 are connectable to circuit 10 for providing electrical energy as necessary to an electrically controllable lock actuator 16 and to switch means 18. Primary power source 12 may be provided by a connection to a DC power supply having a voltage on the order of +12 volts for example. In a vending machine application such connection may be to a power supply of another device within the vending machine such as a power supply within a bill validator, a power supply within a coin acceptor, or a power supply of the vending machine itself. It is also recognized that primary power source 12 may be provided by a connection to a power supply which is utilized solely for purposes of the circuit 10.

With respect to reserve power source 14, such source may be, for example, a +9 volt battery connected to circuit 10 as shown. In particular, reserve power source 14 is connected between ground and lock actuator 16, with switch means 18 connected therebetween. A diode 20 is connected between reserve power source 14 and switch means 18 and a diode 22 is connected between primary power source 12 and switch means 18 such that a cathode of diode 22 is connected between diode 20 and switch means 18. A diode 24 is connected between primary power source 12 and lock actuator 16, and a diode 26 is connected between switch means 18 and lock actuator 16, a cathode of diode 26 being connected to a cathode of diode 24. A diode 23 is connected in parallel with lock actuator 16. Diode 24 is also connected between primary power source 12 and diode 22 and in series therewith.

Processing means 28 includes an input 30 operatively connected between switch means 18 and diode 26 through a resistor 32, a resistor 34 also being connected between input 30 and ground. Input link 36 and output link 38 of processing means 28 are also shown. An output 40 of processing means 28 is operatively connected to a control input of transistor 42, which transistor 42 is connected between both diode 26 and ground and diode 24 and ground, and is preferably connected between lock actuator 16 and ground as shown. Output 40 is shown connected through resistor 44, inverter 46, and resistor 48. A capacitor 49 may also be connected as shown.

A voltage regulator 50 includes an input 52 operatively connected to primary power source 12 through diode 24, input 52 being connected between diode 24 and diode 22. Voltage regulator 50 includes a regulated output 54, a diode 56 being connected between processing means input 30 and regulated output 54. A capacitor 58 is connected between regulated output 54 and ground and a power input ($V_{CC}$) of processing means 28 is connected to regulated output 54. A capacitor 60 is also shown connected between $V_{CC}$ and ground.

The general operation of the present invention and the components thereof is now described. As an initial matter it is seen that electrical energy can be provided to lock actuator 16 either from primary power source 12 or from reserve power source 14, and power for processing means 28 may likewise be provided by either primary power source 12 or reserve power source 14. The circuit 10 is intended to provide such electrical energy and power in a manner which facilitates control of lock actuator 16 when energy from primary power source 12 is unavailable while at the same time avoiding unnecessary use of reserve power source 14 so as to extend the useful life thereof. Electrical energy may be unavailable from primary power source 12 due to a power outage, due to a vending machine being unplugged, or due to failure of the power supply which provides primary power source 12. As used in the following description of operation the terminology "normal voltage level" of primary power source 12 is the voltage level typically provided by primary power source 12 under normal conditions, that is, when the vending machine is plugged in and the power supply which provides the primary power source 12 is functioning properly. In this example, such normal voltage level of primary power source 12 is defined as +12 volts. Likewise, the terminology "normal voltage level" of reserve power source 14 is the voltage level typically provided by reserve power source 14 under normal conditions, that is, when the battery which provides reserve power source 14 is properly connected and is not dead. In this example, such normal voltage level of reserve power source 14 is defined as +9 volts.

Referring now to operation of circuit 10, when switch means 18 is open it is seen that no voltage can be applied to input 30 of processing means 28, diode 26 being placed to assure that a voltage is only applied at input 30 when switch means 18 is closed. However, when switch means 18 is closed, a voltage is applied at such input 30. In particular, the normal voltage level of primary power source 12 is sufficiently greater than the normal voltage level of reserve power source 14 such that when both normal voltage levels are present diode 20 remains in an OFF state when switch means 18 is closed, and diode 22 is in an ON state. In such case the voltage applied at input 30 of processing means 28 will be the voltage drop across resistor 34 and such voltage is provided from primary power source 12. In the event that primary power source 12 fails, such as is the case when a vending machine is unplugged or there is a power outage at the vending machine location, the normal voltage level of primary power source 12 will not be present and an actual voltage level of primary power source 12 will fall to substantially zero. In such case diode 20 is placed in an ON state when switch means 18 is closed and the voltage applied at input 30 of processing means 28 is provided from reserve power source 14.

Controlled delivery of electrical energy to lock actuator 16 is achieved by controlling the ON/OFF state of transistor 42. Processing means 28 includes output 40 connected for such purpose in that by switching the high/low state at output 40 the ON/OFF state of transistor can be controlled. In particular, in the illustrated embodiment a high output (+5 volts) at output 40 will be inverted by inverter 46 placing the control input of transistor 42 in a low state (GND) which results in transistor 42 being OFF. A low output (GND) at output 40 is inverted by inverter 46 placing the control input of transistor 42 in a high state (+5 volts) which results in transistor 42 being ON. Only when transistor 42 is ON can current be delivered to lock actuator 16. In this regard, and assuming transistor 42 is ON, the electrical energy delivered to lock actuator 16 will be provided from either primary power source 12 or from reserve power source 14. Particularly, the normal voltage level of primary power source 12 is sufficiently greater than the normal voltage level of reserve power source 14 such that when both normal voltage levels are present diode 20 remains in an OFF state when switch means 18 is closed and the current delivered to lock actuator 16 is provided from primary power source 12 through diode 24. In the event that primary power source 12 fails, the normal voltage level of primary power source 12 is not present and an actual voltage level of primary power source 12 falls substantially to zero. In such case diode 20 is placed in an ON state when switch means 18 is closed and the current delivered to lock actuator 16 is provided from reserve power source 14 through diode 26.

Processing means 28 may be operable, through programming associated therewith, to be responsive to the voltage applied at input 30. For example, such applied voltage may act as an enable or triggering input which alerts processing means 28 to the potential receipt of lock control information at input link 36. Similarly, depending upon the connections to links 36 and 38 such applied voltage at input 30 may trigger processing means 28 to initiate a communication protocol. In either event, if predetermined lock control information is received by processing means 28, such processing means 28 is operable to alter output 40 so as to place transistor 42 in an ON state as desired to control lock actuator 16 for an unlocking operation for example.

Also shown in circuit 10 is voltage regulator 50. The voltage or electrical energy applied at input 52 thereof may come from either primary power source 12 or reserve power source 14 much as described above. For example, if the normal voltage level of primary power source is present then the voltage applied at input 52 will be provided from primary power source 12. In the event that primary power source 12 fails such that the actual voltage level thereof falls to substantially zero, closure of switch means 18 will place diode 20 in an ON state such that the voltage present at input 52 of voltage regulator 50 is provided from reserve power source 14 through diode 26. Thus, even in the event of a power outage, power supply failure, or unplugged vending machine, reserve power source 14 provides the power necessary for operation of processing means 28. In this regard, diode 24 is important to prevent drainage of reserve power source 14 along the path of primary power source 12.

Diode 56 is connected between input 30 of processing means 28 and regulated output 54 of voltage regulator 50 in order to prevent the voltage applied at input 30 from being excessively high. In particular, the voltage at regulated output 54 may be on the order of +5 volts so that the voltage at input 30 will be clamped to a maximum of about +5.7 volts. Capacitor 58 is selected for ripple reduction of the voltage at regulated output 54 and capacitor 60 is selected for noise decoupling at processing means power input $V_{CC}$. Capacitor 49 and resistor 44 may be selected in combination to provide a delay in time between the switch between a high/low state at output 40 and the high/low state at the input to inverter 46 so as to avoid undesired delivery of current to lock actuator 16 during resetting or initializing of processing means 28 as a result of a power interrupt.

From the preceding description of the illustrated embodiment, it is evident that the objects of the invention are attained. Although the invention has been described and illustrated in detail, it is to be clearly understood that the same is intended by way of illustration and example only and is not to be taken by way of limitation. For example, the voltages referenced above for each respective power source are exemplary only, it being recognized that other suitable voltages could be used for each respective power source. As a general rule primary power source 12 should have a normal voltage level which is sufficiently greater than a normal voltage level of reserve power source 14 to assure that diode 20 remains OFF when switch means 18 is closed and as long as the normal voltage level of primary power source 16 is present. It is also recognized that a circuit in accordance with the present invention may comprise just a portion of a larger circuit. For example, it is recognized that processing means 28 could include more input/output connections and associated circuitry. Accordingly, the spirit and scope of the invention are to be limited only by the terms of the appended claims.

What is claimed is:

1. A circuit for delivering electrical energy to an electrically controllable lock actuator of a vending machine, the circuit comprising:

a primary power source for supplying electrical energy to the lock actuator;

a reserve power source connected between ground and the lock actuator;

switch means connected between the reserve power source and the lock actuator, actuation of the switch means for providing the reserve power source to the lock actuator at a time when the primary power source has been removed from the circuit;

a first diode connected between the reserve power source and the lock actuator;

a second diode connected between the primary power source and the switch means such that a cathode of the second diode is connected between the first diode and the switch means; and processing means including a first input connected between the switch means and the lock actuator the processing means for controlling operation of the lock actuator, the primary power source being connected to the processing means, the processing means for determining when the primary power source has been removed from the circuit and when the switch means has been actuated to allow the lock actuator to be operated.

2. The circuit, as set forth in claim 1, wherein the switch means is a mechanically actuated switch means.

3. The circuit, as set forth in claim 1, wherein the switch means is a magnetically actuated switch means.

4. The circuit, as set forth in claim 1, wherein the reserve power source comprises a battery.

5. The circuit, as set forth in claim 1, wherein a voltage is applied at the first input of the processing means when the switch means is closed.

6. The circuit, as set forth in claim 5, wherein a normal voltage level of the primary power source is sufficiently greater than a normal voltage level of the reserve power source such that when both normal voltage levels are present the first diode remains in an OFF state when the switch means is closed and the voltage applied at the first input of the processing means is provided from the primary power source.

7. The circuit, as set forth in claim 6 wherein, if the normal voltage level of the primary power source is not present such that an actual voltage level of the primary power source falls substantially to zero, the first diode is placed in an ON state when the switch means is closed and the voltage applied at the first input of the processing means is provided from the reserve power source.

8. The circuit, as set forth in claim 1, further comprising:

a third diode connected between the primary power source and the lock actuator;

a fourth diode connected between the switch means and the lock actuator; and a transistor connected between both the third diode and ground and the fourth diode and ground for enabling controlled current delivery to the lock actuator, an output of the processing means operatively connected to a control input of the transistor for effecting control of such current delivery.

9. The circuit, as set forth in claim 8, further comprising:

a voltage regulator including an input operatively connected to the primary power source through the third diode, the voltage regulator having a regulated output;

wherein a cathode of the third diode is connected to a cathode of the fourth diode; and wherein a power input of the processing means is operatively connected to receive power from the regulated output of the voltage regulator.

10. The circuit, as set forth in claim 9, further comprising:

a fifth diode connected between the first input of the processing means and the regulated output of the voltage regulator.

11. The circuit, as set forth in claim 8, wherein the processing means includes a second input for receiving lock control information, the processing means operable to effect delivery of current to the lock actuator in response to receipt of predetermined lock control information.

12. The circuit, as set forth in claim 11, wherein a normal voltage level of the primary power source is sufficiently greater than a normal voltage level of the reserve power source such that when both normal voltage levels are present the first diode remains in an OFF state when the switch means is closed and the current delivered to the lock actuator in response to the predetermined lock control information is provided from the primary power source through the third diode.

13. The circuit, as set forth in claim 12, wherein, if the normal voltage level of the primary power source is not present such that an actual voltage level of the primary power source falls substantially to zero, the first diode is placed in an ON state when the switch means is closed and the current delivered to the lock actuator in response to the predetermined lock control information is provided from the reserve power source through the fourth diode.

14. A circuit for controlling delivery of electrical energy to an electrically controllable lock actuator from a primary power source and a reserve power source, the circuit comprising:

switch means connected between the reserve power source and the lock actuator, actuation of the switch means for providing the reserve power source to the lock actuator at a time when the primary power source has been removed from the circuit a first diode connected between the reserve power source and the switch means;

a second diode connected between the primary power source and the lock actuator;

a third diode connected between the second diode and the switch mean such that a cathode of the third diode is connected between a cathode of the first diode and the switch means; and a fourth diode connected between the switch means and the lock actuator, a cathode of the fourth diode being connected to a cathode of the second diode, the first diode for providing a current from the reserve power source through the switch means and the fourth diode to the lock actuator whenever the switch means is actuated and at a time when the primary power source has been removed from the circuit and the second diode for preventing drainage of the reserve power source through the primary source whenever the switch means is actuated and at a time when the primary power source has been removed from the circuit.

15. The circuit, as set forth in claim 14, wherein the switch means comprises a mechanically actuated switch means.

16. The circuit, as set forth in claim 14, wherein the switch means comprises a magnetically actuated switch means.

17. The circuit, as set forth in claim 14, wherein the reserve power source comprises a battery.

18. The circuit, as set forth in claim 14, further comprising:

processing means including a first input operatively connected between the switch means and the fourth diode; and a transistor connected between both the fourth diode and ground and the second diode and ground for enabling controlled current delivery to the lock actuator, an output of the processing means operatively connected to a control input of the transistor for effecting control of such current delivery.

19. The circuit, as set forth in claim 18, further comprising:

a voltage regulator including an input operatively connected to the primary power source through the second diode, the voltage regulator having a regulated output; and wherein a power input of the processing means is operatively connected to the regulated output of the voltage regulator.

20. The circuit, as set forth in claim 19, further comprising:

a fifth diode connected between the first input of the processing means and the regulated output of the voltage regulator.

21. A circuit for controlling delivery of electrical energy to an electrically controllable lock actuator, the circuit comprising:

a primary power source for supplying electrical energy to the lock actuator;

a first diode connected between the primary power source and the lock actuator, the first diode having a cathode connected to the lock actuator;

a reserve power source connected between ground and the lock actuator;

normally-open switch means connected between the reserve power source and the lock actuator, actuation of the normally-open switch means for providing the reserve power source to the lock actuator at a time when the primary power source has been removed from the circuit;

a second diode connected between the normally-open switch means and the lock actuator, the second diode having a cathode connected to the lock actuator;

processing means including a first input connected between the normally-open switch means and the second diode, the processing means for controlling operation of the lock actuator and for determining when the primary power source has been removed from the circuit and when the normally-open switch means has been actuated; and circuit means for applying a voltage to the first input of the processing means when the normally-open switch means is closed such that the applied voltage is provided from the reserve power source which is connected to the circuit means, and when the voltage is applied to the first input the processing means is able to operate the lock actuator.

22. The circuit, as set forth in claim 21, wherein the normally-open switch means comprises a mechanically actuated switch means.

23. The circuit, as set forth in claim 21, wherein the normally-open switch means comprises a magnetically actuated switch means.

24. The circuit, as set forth in claim 21, wherein the circuit means includes a third diode connected between the reserve power source and the normally-open switch means, and a fourth diode connected between the first diode and the normally-open switch means such that a cathode of the fourth diode is connected between the third diode and the normally-open switch means.

25. The circuit, as set forth in claim 24, further comprising:

a voltage regulator having an input connected between the first diode and the fourth diode and having a regulated output; and wherein a power input of the processing means is operatively connected to the regulated output of the voltage regulator.

26. The circuit, as set forth in claim 25, further comprising:

a resistor connected between ground and the first input of the processing means; and a fifth diode connected between the first input of the processing means and the regulated output of the voltage regulator.

27. The circuit, as set forth in claim 25, further comprising:

a transistor connected between the lock actuator and ground, an output of the processing means operatively connected to a control input of the transistor for effecting control of the state thereof.

* * * * *